(12) United States Patent
Zhou et al.

(10) Patent No.: US 8,899,078 B2
(45) Date of Patent: Dec. 2, 2014

(54) GLASS SHEET STABILIZING SYSTEM, GLASS MANUFACTURING SYSTEM AND METHOD FOR MAKING A GLASS SHEET

(75) Inventors: Naiyue Zhou, Painted Post, NY (US); Wei Xu, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 1262 days.

(21) Appl. No.: 12/324,459

(22) Filed: Nov. 26, 2008

(65) Prior Publication Data
US 2010/0126226 A1   May 27, 2010

(51) Int. Cl.
*C03B 17/06* (2006.01)
(52) U.S. Cl.
CPC ................................. *C03B 17/068* (2013.01)
USPC .......................................................... 65/195
(58) Field of Classification Search
CPC .... C03B 17/064; C03B 17/068; C03B 29/10; C03B 2225/02
USPC ................... 65/253, 185, 186, 245, 25.4, 101
See application file for complete search history.

(56) References Cited

U.S. PATENT DOCUMENTS

| | | |
|---|---|---|
| 3,338,696 A | 8/1967 | Dockerty |
| 3,372,016 A | 3/1968 | Rahrig et al. |
| 3,682,609 A | 8/1972 | Dockerty |
| 4,139,359 A | 2/1979 | Johnson et al. ................. 65/107 |
| 4,217,126 A | 8/1980 | Hagedorn et al. ............. 65/106 |
| 4,261,723 A | 4/1981 | Hargrave ........................ 65/114 |
| 4,381,933 A | 5/1983 | Schultz et al. .................. 65/106 |
| 4,780,164 A | 10/1988 | Rueckheim et al. .......... 156/104 |
| 6,397,634 B1 * | 6/2002 | Takeda et al. ................... 65/102 |
| 6,502,423 B1 * | 1/2003 | Ostendarp et al. ........... 65/29.14 |
| 7,231,786 B2 | 6/2007 | Cimo et al. ........................ 65/91 |
| 2003/0121287 A1 | 7/2003 | Chalk et al. ........................ 65/90 |
| 2005/0178159 A1 | 8/2005 | Shiraishi et al. ............. 65/182.2 |
| 2005/0268655 A1 * | 12/2005 | Butts et al. .................... 65/29.12 |
| 2006/0042314 A1 | 3/2006 | Abbott, III et al. ............ 65/25.3 |
| 2006/0081009 A1 | 4/2006 | Maldonado ...................... 65/195 |
| 2006/0280920 A1 | 12/2006 | Abbott, III .................... 428/210 |

(Continued)

FOREIGN PATENT DOCUMENTS

| | | |
|---|---|---|
| CN | 2277990 Y | 4/1998 |
| WO | WO 2008050605 A1 * | 5/2008 |

OTHER PUBLICATIONS

Arthur P. Boresi, *Advanced Mechanics of Materials*, John Wiley & Sons, Inc., 6$^{th}$ ed., 1924, pp. 431-432 and p. 439.

(Continued)

*Primary Examiner* — Erin Snelting
(74) *Attorney, Agent, or Firm* — Kevin M. Able

(57) ABSTRACT

A stabilizing system is described herein that reinforces a bowed profile of a downward moving glass sheet which helps to reduce the creation of stress within the glass sheet. In another embodiment, the stabilizing system can also form a rigid zone within the glass sheet which blocks or dampens any disturbances (motion) to the glass sheet that is caused by the scoring and separating of the glass sheet from transferring up the glass sheet. In yet another embodiment, the stabilizing system can also flatten the glass sheet before the scoring and separating of the glass sheet which is desirable because it enables a laser scoring mechanism to cut the glass sheet with the required edge straightness and avoids having to perform another precision cutting process.

16 Claims, 8 Drawing Sheets

(56) References Cited

U.S. PATENT DOCUMENTS

| | | | |
|---|---|---|---|
| 2007/0062219 A1 | 3/2007 | Blevins et al. | 65/91 |
| 2008/0131651 A1 | 6/2008 | Burdette et al. | 428/98 |
| 2008/0276646 A1 | 11/2008 | Chalk et al. | 65/17.2 |
| 2010/0031702 A1* | 2/2010 | Tomamoto et al. | 65/91 |

OTHER PUBLICATIONS

Corning Incorporated U.S. Appl. No. 12/008,949, filed Jan. 15, 2008—pending.

Corning Incorporated U.S. Appl. No. 11/978,333, filed Jan. 13, 2008—pending.

* cited by examiner

GLASS SHEET STABILIZING SYSTEM, GLASS MANUFACTURING SYSTEM AND METHOD FOR MAKING A GLASS SHEET

TECHNICAL FIELD

The present invention relates in general to the glass manufacturing field and, in particular, to a stabilizing system that reinforces a bowed profile of a downward moving glass sheet to prevent the bowed profile of the glass sheet from varying and to thereby stabilize the glass sheet and maintain a stable, consistent glass sheet shape.

BACKGROUND

Corning Incorporated has developed a process known as the fusion process (e.g., downdraw process) to form high quality thin glass sheets that can be used in a variety of devices like flat panel displays (e.g., flat panel liquid crystal displays). The fusion process is the preferred technique for producing glass sheets used in flat panel displays because the glass sheets produced by this process have surfaces with superior flatness and smoothness when compared to glass sheets that are produced by other methods. The fusion process is briefly described below with respect to FIG. 1 (PRIOR ART) but for a more detailed description about the fusion process reference is made to co-assigned U.S. Pat. Nos. 3,338,696 and 3,682,609. The contents of these documents are hereby incorporated by reference herein.

Referring to FIG. 1 (PRIOR ART), there is shown a schematic view of an exemplary glass manufacturing system 100 which utilizes the fusion process to make a glass sheet 138. As shown, the exemplary glass manufacturing system 100 includes a melting vessel 102, a fining vessel 104, a mixing vessel 106 (e.g., stir chamber 106), a delivery vessel 108 (e.g., bowl 108), a fusion draw machine (FDM) 110, and a traveling anvil machine (TAM) 112. Typically, the components 104, 106 and 108 are made from platinum or platinum-containing metals such as platinum-rhodium, platinum-iridium and combinations thereof, but they may also comprise other refractory metals such as molybdenum, palladium, rhenium, tantalum, titanium, tungsten, or alloys thereof.

The melting vessel 102 is where the glass batch materials are introduced as shown by arrow 114 and melted to form molten glass 116. The melting vessel 102 is connected to the fining vessel 104 (e.g., finer tube 104) by a melting to fining vessel connecting tube 113. The fining vessel 104 has a high temperature processing area that receives the molten glass 116 (not shown at this point) from the melting vessel 102 and in which bubbles are removed from the molten glass 116. The fining vessel 104 is connected to the mixing vessel 106 (e.g., stir chamber 106) by a finer to stir chamber connecting tube 118. And, the mixing vessel 106 is connected to the delivery vessel 108 by a stir chamber to bowl connecting tube 120. The delivery vessel 108 delivers the molten glass 116 through a downcomer 122 into the FDM 110 which includes an inlet 124, a forming vessel 126 (e.g., isopipe 126), and a pull roll assembly 128.

As shown, the molten glass 116 flows from the downcomer 122 into the inlet 124 which leads to the forming vessel 126 (e.g., isopipe 126) which is typically made from a ceramic or a glass-ceramic refractory material. The forming vessel 126 includes an opening 130 that receives the molten glass 116 which flows into a trough 132 and then overflows and runs down two lengthwise sides 134 (only one side shown) before fusing together at what is known as a root 136. The root 136 is where the two lengthwise sides 134 come together and where the two overflow walls of molten glass 116 rejoin (e.g., re-fuse) to form the glass sheet 138 which is then drawn downward by the pull roll assembly 128. The pull roll assembly 128 delivers the drawn glass sheet 138 which, at this point in the process, is substantially flat but later in the process typically develops a slightly curved/bowed shape across the glass sheet 138. This bowed shape may remain in the glass sheet 138 all the way to the TAM 112. The TAM 112 has a mechanical scoring device 146 (e.g., scoring wheel 146) and a nosing device 148 which are used to mechanically score the drawn glass sheet 138 so it can then be separated into distinct pieces of glass sheets 142. The TAM 112 is located in an area referred to herein as a bottom of the draw 140 (BOD 140).

The TAM's 112 scoring and separating processes cause motion in the glass sheet 138 at the BOD 140 which contributes to the creation of undesirable stress, position and shape variations within the glass sheet 138 in the forming region located up near the FDM 110. For instance, it has been seen during the scoring and separating processes that the glass sheet 138 generally moves back-and-forth by more than 5 mm. There are several problems which can occur whenever the glass sheet 138 distorts or warps due to the sheet shape, position and motions changes etc. . . . caused during the BOD 140 sheet separation (scoring, bending, separating etc. . . . ) processes. For instance, changes in sheet shape, position and motion can detrimentally affect the forming process in the FDM 110. This is because the conditions of the glass in the FDM 110 are tightly controlled in a steady state manner during the forming process using elements such as radiant and conductive heating or cooling elements, and contact and non-contact positioning and drawing mechanisms. Thus, if the position or shape of the glass sheet 138 varies beyond acceptable limits, then this tight control is disrupted and the conditions of the glass may vary resulting in unacceptable glass formation in the FDM 100. In addition, the resulting glass sheets 138 which vary in shape from sheet to sheet is not a desirable situation for the customers. Furthermore, the scoring device 146 in the BOD 140 must follow the curvature/bow of the glass sheet 138 to properly score the glass sheet 138. Thus, if the sheet shape varies beyond acceptable limits then the scoring device 146 may not adequately score the glass sheet 138 without the use of complex and expensive sheet shape detection devices and variable path-motion scoring equipment within the BOD 140. Accordingly, there is a need for a device that stabilizes the glass sheet 138 and maintains accurate positional, shape and motion control of the glass sheet 138 at both the FDM 110 and BOD 140. The impact of such a device will be especially significant for tall draw or large size platforms, such as Gen 7 and larger, where the distance between FDM 110 and TAM 140 is relatively long or the width of the glass sheet 138 is relatively large. This need and other needs are satisfied by the stabilizing system, the glass manufacturing system, and the manufacturing method of the present invention.

SUMMARY

The present invention includes a stabilizing system for reinforcing a bowed profile of a downward moving glass sheet, where the stabilizing system includes: (a) a first edge guide roll pair; (b) a second edge guide roll pair; (c) where a first edge portion of the glass sheet is drawn between two horizontally tilted rolls associated with the first edge guide roll pair, and an opposing second edge portion of the glass sheet is drawn between two horizontally tilted rolls associated with the second edge guide roll pair; and (d) where the two horizontally tilted rolls associated with the first edge guide roll pair are tilted to have orientations similar to the first edge portion of the glass sheet so as to reinforce the bowed profile of the glass sheet, and the two horizontally tilted rolls associated with the second edge guide roll pair are tilted to have orientations similar to the second edge portion of the glass sheet so as to reinforce the bowed profile of the glass sheet. In addition, the stabilizing system may also have edge squeeze rolls which help to form a rigid zone within the glass sheet which blocks or dampens any disturbances (motion) to the glass sheet caused by the BOD operations from transferring up to the glass sheet located in a FDM. Furthermore, the stabilizing system may have edge rolls that flatten the glass sheet before it enters the TAM which is desirable because it enables either a laser scoring mechanism or a mechanical scoring mechanism to cut the flatten glass sheet with the required edge straightness and avoids having to perform another precision cutting process. Lastly, the present invention provides a glass manufacturing system and a method which uses the stabilizing system when producing a glass sheet.

BRIEF DESCRIPTION OF THE DRAWINGS

A more complete understanding of the present invention may be had by reference to the following detailed description when taken in conjunction with the accompanying drawings wherein.

DETAILED DESCRIPTION

Figure 1:
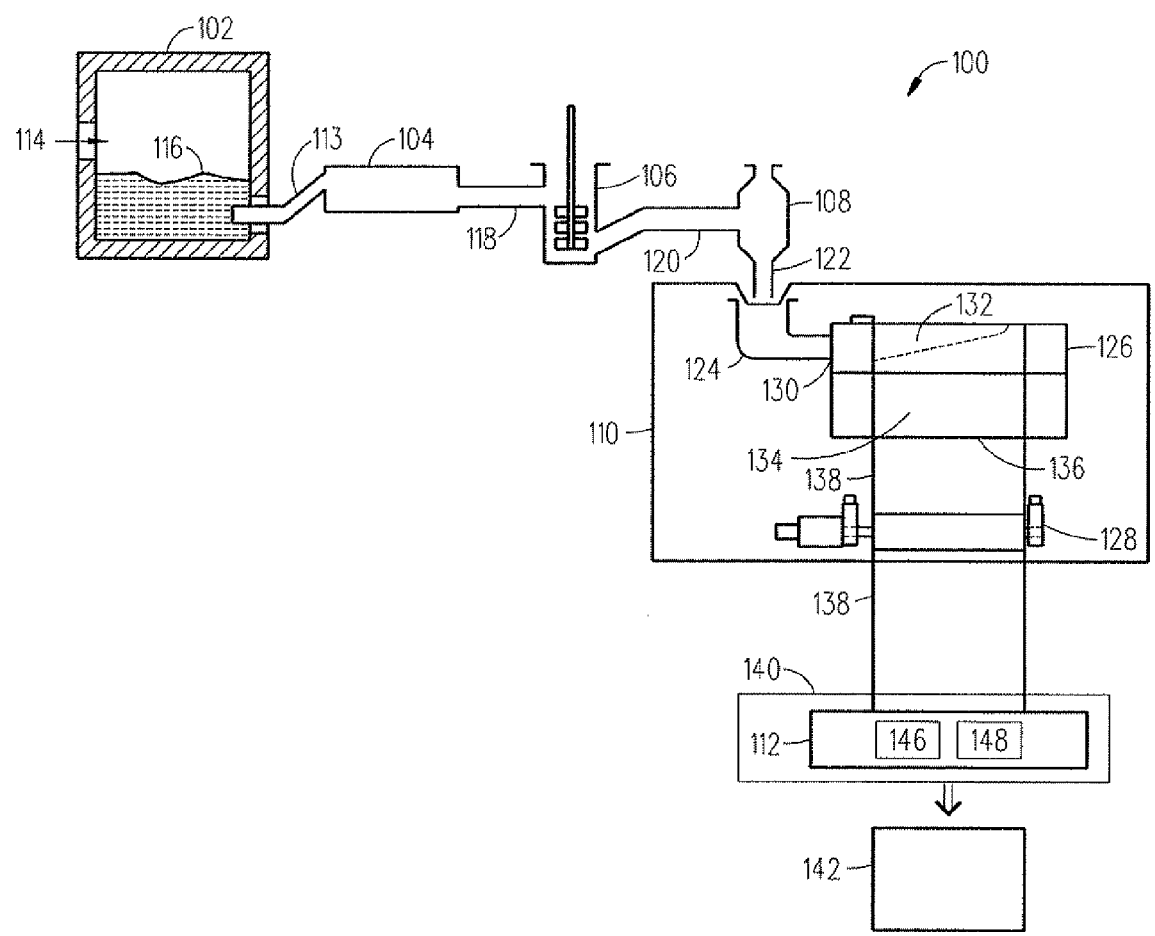
FIG. 1 (PRIOR ART) is a schematic view of an exemplary traditional glass manufacturing system which uses a fusion process to manufacture a glass sheet.
Figure 2:
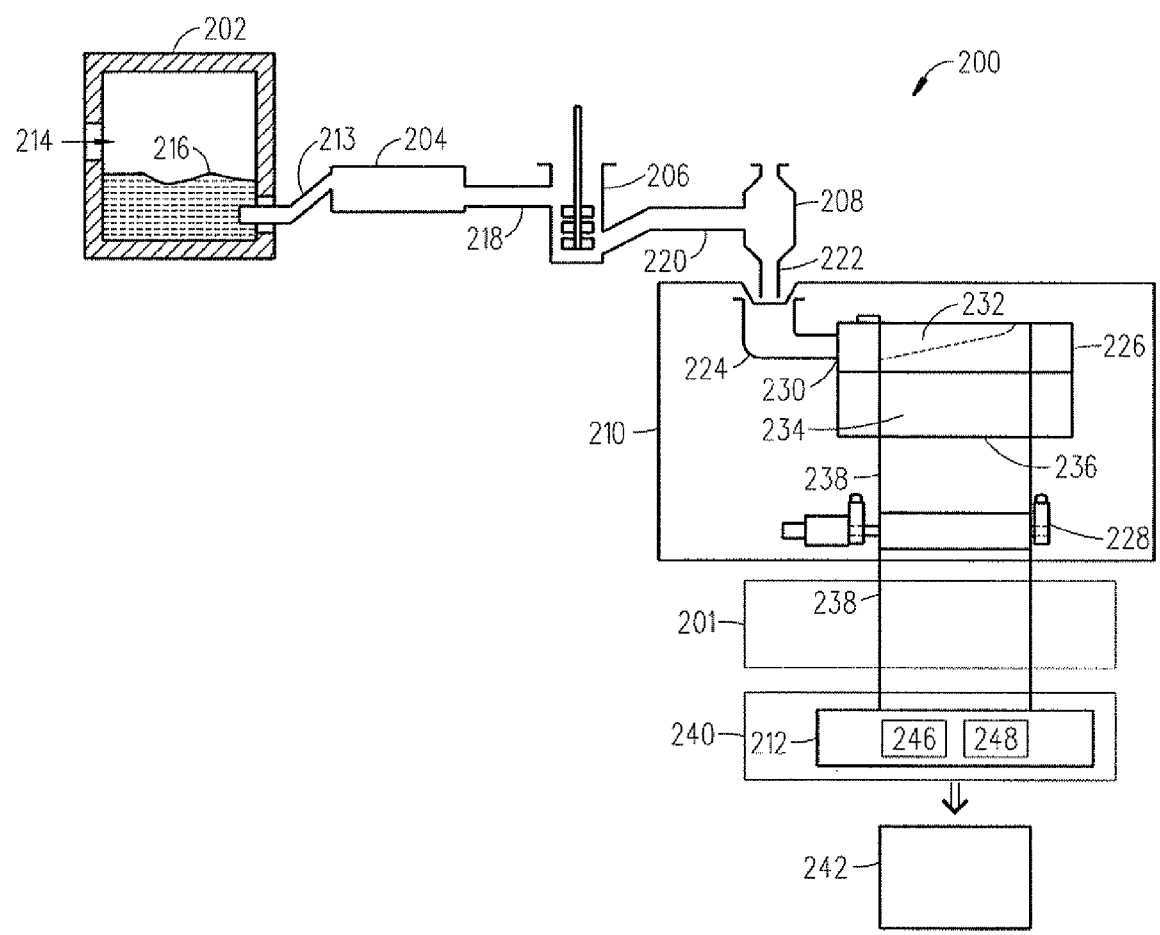
FIG. 2 is a schematic view of an exemplary glass manufacturing system which uses the fusion process and a stabilizing system to manufacture a glass sheet in accordance with an embodiment of the present invention.

Referring to FIG. 2, there is shown a schematic view of an exemplary glass manufacturing system 200 which utilizes a stabilizing system 201 that reinforces a bowed profile of a glass sheet 238 which improves FDM 210 forming process stability, reduces the creation of stress within the glass sheet 238, and reduces variations in glass sheet shape, position and motion in accordance with an embodiment of the present invention. Prior to describing the stabilizing system 201 in detail a brief discussion is first provided about the exemplary glass manufacturing system 200 which uses the fusion process to make the glass sheet 238. Although the glass manufacturing system 200 that is described herein uses the fusion process to make the glass sheet 238, it should be understood that the stabilizing system 201 could be incorporated within and used by any type of glass manufacturing system. For example, the stabilizing system 201 can be used in combination with a fusion draw, slot draw, down draw, and other glass sheet forming methods which have continuous glass sheet forming and separation processes. Accordingly, the stabilizing system 201 of the present invention should not be construed in a limited manner.

The exemplary glass manufacturing system 200 shown in FIG. 2 includes a melting vessel 202, a fining vessel 204, a mixing vessel 206 (e.g., stir chamber 206), a delivery vessel 208 (e.g., bowl 208), a FDM 210, the stabilizing system 201, and a TAM 212. Typically, the components 204, 206 and 208 are made from platinum or platinum-containing metals such as platinum-rhodium, platinum-iridium and combinations thereof, but they may also comprise other refractory metals such as molybdenum, palladium, rhenium, tantalum, titanium, tungsten, or alloys thereof.

The melting vessel 202 is where the glass batch materials are introduced as shown by arrow 214 and melted to form molten glass 216. The melting vessel 202 is connected to the fining vessel 204 (e.g., finer tube 204) by a melting to fining vessel connecting tube 213. The fining vessel 204 has a high temperature processing area that receives the molten glass 216 (not shown at this point) from the melting vessel 202 and in which bubbles are removed from the molten glass 216. The fining vessel 204 is connected to the mixing vessel 206 (e.g., stir chamber 206) by a finer to stir chamber connecting tube 218. And, the mixing vessel 206 is connected to the delivery vessel 208 by a stir chamber to bowl connecting tube 220. The delivery vessel 208 delivers the molten glass 216 through a downcomer 222 into the FDM 210 which includes an inlet 224, a forming vessel 226 (e.g., isopipe 226), and a pull roll assembly 228.

As shown, the molten glass 216 flows from the downcomer 222 into the inlet 224 which leads to the forming vessel 226 (e.g., isopipe 226) which is typically made from a ceramic or a glass-ceramic refractory material. The forming vessel 226 includes an opening 230 that receives the molten glass 216 which flows into a trough 232 and then overflows and runs down the two lengthwise sides 234 (only one side shown) before fusing together at what is known as a root 236. The root 236 is where the two lengthwise sides 234 come together and where the two overflow walls of molten glass 216 rejoin (e.g., re-fuse) to form the glass sheet 238 which is then drawn downward by the pull roll assembly 228. The pull roll assembly 228 delivers the drawn glass sheet 238 which at this point in the process has a curved/bowed shape to the TAM 212. The TAM 212 has a mechanical scoring device 246 (e.g., scoring wheel 246) and a nosing device 248 which are used to mechanically score the drawn glass sheet 238 so that it can be separated into distinct pieces of glass sheets 242. The TAM 212 is located in an area referred to herein as a bottom of the draw 240 (BOD 240).

Figure 3:
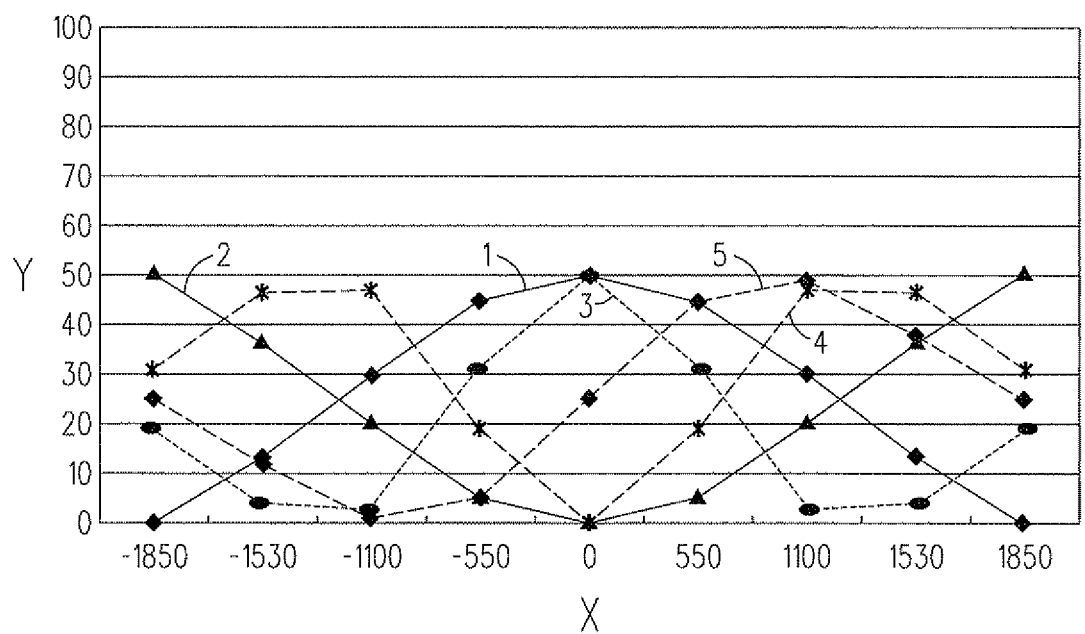
FIG. 3 is a plot which illustrates an example of a preferred positive bell bowed shape and several other bowed shapes that the glass sheet could have when being manufactured by the glass manufacturing system of FIG. 2 in accordance with an embodiment of the present invention.

The TAM's 212 scoring and separating processes if not addressed will cause motion in the glass sheet 238 at the BOD 240 which leads to the creation of undesirable stress variations and variations in glass sheet shape, position and motion within the glass sheet 238 up near the FDM 210. The stabilizing unit 201 addresses this problem by stabilizing the glass sheet 238 and maintaining accurate positional control of the glass sheet 238 at both the FDM 210 and BOD 240. To help explain how the stabilizing system 201 solves this problem it should first be explained that without the stabilizing unit 201 the glass sheet 238 can have anyone of five exemplary bowed shapes shown in the plot of FIG. 3, or other shapes not illustrated. In this plot, the x-axis is the cross-wise location on the glass sheet 238 (for example, the location along one of the lines 414a or 414b in FIG. 4A) relative to the center of the glass sheet 238 (e.g. 0 mm, at centerline 504 in FIG. 5A) in millimeters (mm), the y-axis is the degree of distortion, displacement or bow of the glass sheet in the Z direction in millimeters (mm), and the following numbering scheme is used to identify each of the five bowed shapes:

1. Positive bell shape.
2. Negative bell shape.
3. W shape.
4. M shape.
5. S shape.

In most cases, the glass sheet 238 has a positive bell shape where it is generally bowed (e.g. out-of-plane) in both horizontal and vertical (traveling) directions. This positive bell bowed shape (and the other bowed shapes) is believed to be due to stress distribution inside the glass sheet 238 which is caused by the temperature variation and thermal stress inside the glass sheet 238. The glass sheet 238 has a bowed shape that will vary and even drift at a given setup-platform. In most setups-platforms, the glass sheet 238 has been seen to have a maximum bow, e.g. maximum variation of the glass sheet 238 position in the Z direction across the glass sheet 238, of about 25 mm, however in some large size draws, for example, larger than Gen 7, the glass sheet 238 can have up to a 50 mm bow. The smallest bow observed has been about 15 mm. In fact, the direction of the bow in the center of the glass sheet 238 has been seen to reverse or "bow pop" during the production process when the FDM forming or the BOD process was unstable. The bow pop is most likely to occur between the positive and negative bell shapes and from the M shape, W shape and S shape to either one of the positive or negative bell shapes. As discussed previously in relation to the undesirability of variable sheet shape, position and motion, this "bow pop" is not desirable.

The stabilizing system 201 was designed with the bowed shaped glass sheet 238 in mind where in fact the stabilizing system 201 was designed to help initiate, if needed, a specific bowed shape like the positive bell shape (for example) in the glass sheet 238 and then it would reinforce and maintain that specific bowed shape (or bowed profile) of the glass sheet 238 so as to stabilize and maintain accurate positional control of the glass sheet 238. An exemplary stabilizing system 201 configured to reinforce and maintain the bowed shape of the glass sheet in accordance with an embodiment of the present invention is described next with respect to FIGS. 4A-4F.

Figure 4A:
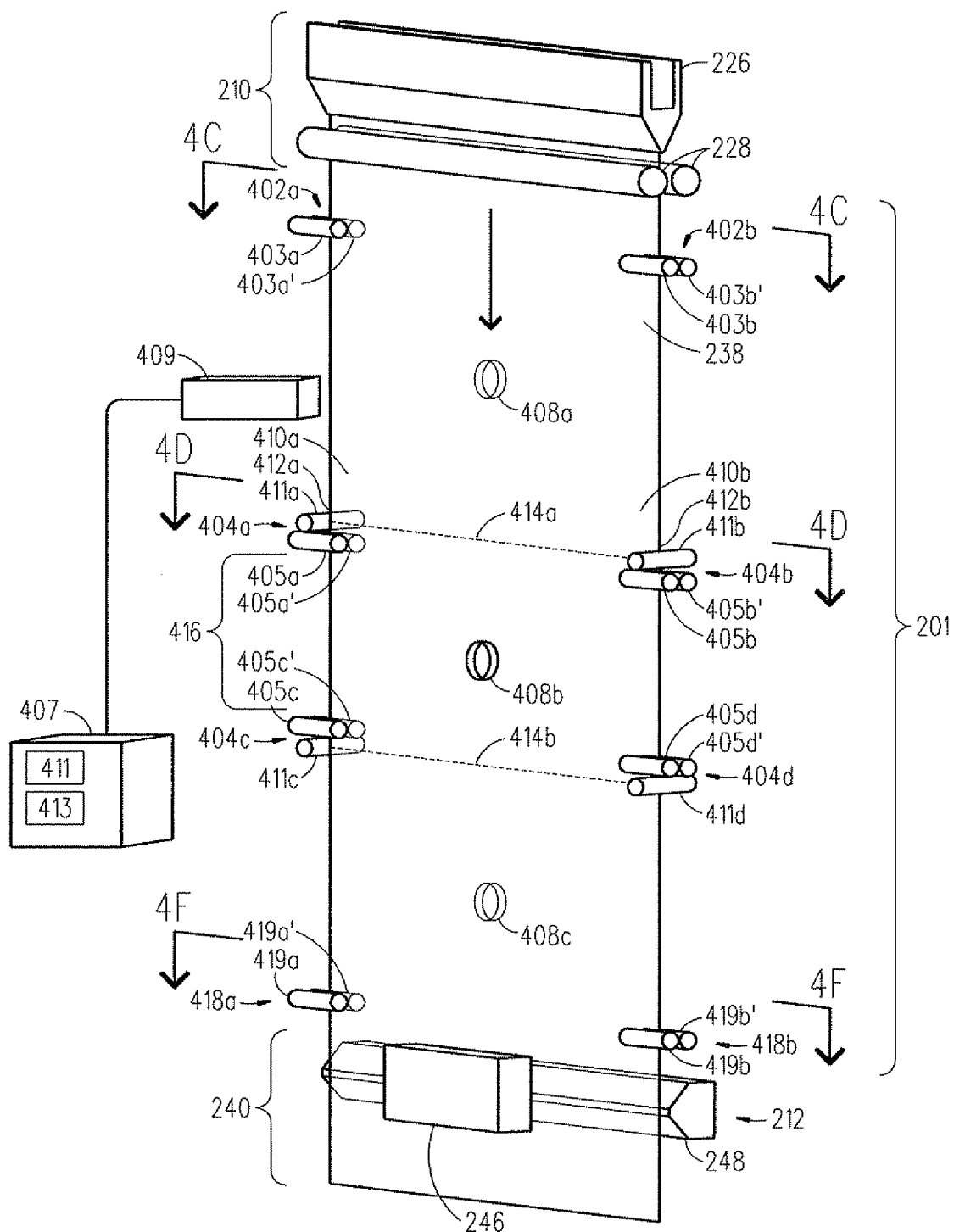
FIGS. 4A-4F are several diagrams which illustrate in greater detail the various components of the stabilizing system which is used to reinforce the bowed shape (e.g., positive bell shape) of the glass sheet in accordance with an embodiment of the present invention.
Figure 4B:
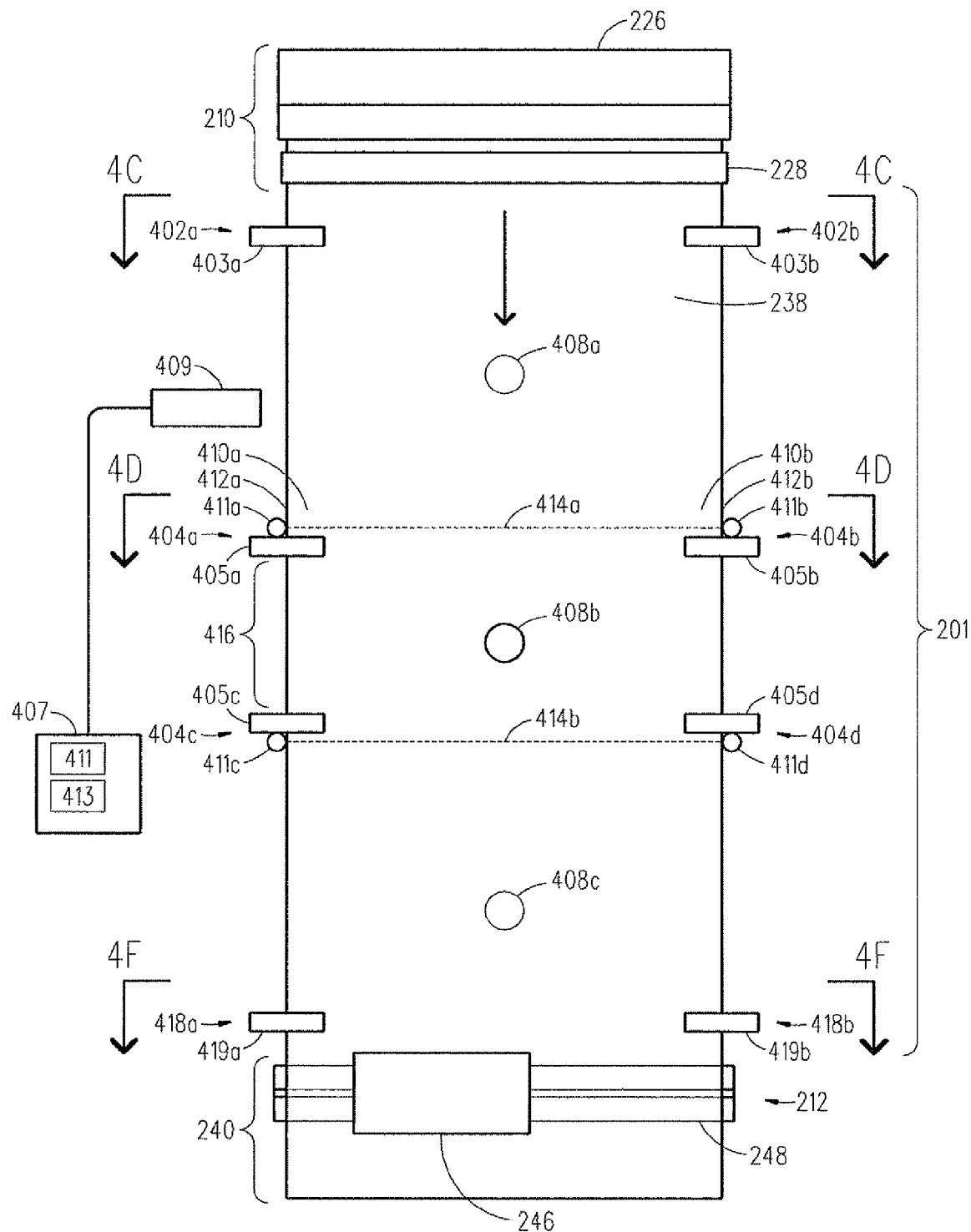
Figure 4C:
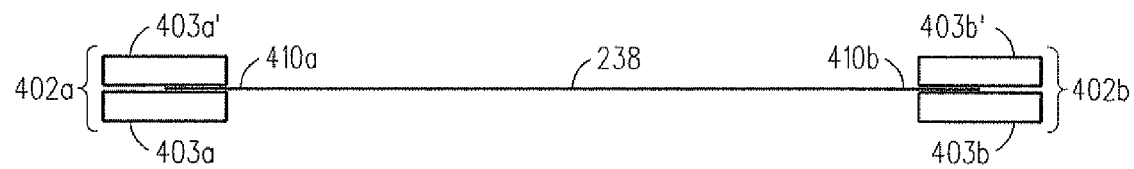

Referring to FIGS. 4A-4F, there are various diagrams of the exemplary stabilizing system 201 in accordance with an embodiment of the present invention. In FIGS. 4A-4B, there are respectively shown a perspective view and a front view of the FDM 210 (including the isopipe 226 and the pull roll assembly 228), the stabilizing unit 201, and the TAM 212 (including the scoring device 246 and the nosing device 248). The stabilizing unit 201 starting from the top includes two edge guide roll pairs 402a and 402b (more possible) whose purpose is to conform to the existing shape of the glass sheet 238 and to provide a smooth transition point for the glass sheet 238 that is exiting the pulling roll assembly 228. The edge guide roll pair 402a includes two rolls 403a and 403a' through which is drawn a first edge portion 410a of the glass sheet 238. The edge guide roll pair 402b includes two rolls 403b and 403b' through which is drawn an opposing second edge portion 410b of the glass sheet 238. The rolls 403a, 403a', 403b and 403b' can be either motor driven or free rolling. The motor driven option is more complicated than the free rolling option. But, the motor driven rolls 403a, 403a', 403b and 403b' or passive rolling rolls 403a, 403a', 403b and 403b' with torque control can be used to minimize the impact of sheet weight variation due to sheet length change during manufacturing process and intermittent robot down force to the root 236 of the glass sheet 238 at the FDM 210 which could help sheet forming process stability and Rubicon recovery. Referring to FIG. 4C, there is a cross-sectional top view of the two edge guide roll pairs 402a and 402b which indicates that at this point the glass sheet 238 does not have a bowed profile but instead the glass sheet 238 is relatively flat. The edge guide roll pairs 402a and 402b would typically not be horizontally tilted because the glass sheet 238 would be relatively flat immediately after being drawn by the pull roll assembly 228.

The stabilizing unit 201 also includes four edge guide roll pairs 404a, 404b, 404c and 404d (more or less is possible) which are located below the two edge guide roll pairs 402a and 402b. The edge guide roll pair 404a includes two horizontally tilted rolls 405a and 405a' through which is drawn the first edge portion 410a of the glass sheet 238. The edge guide roll pair 404b includes two horizontally tilted rolls 405b and 405b' through which is drawn the opposing second edge portion 410b of the glass sheet 238. The edge guide roll pair 404c includes two horizontally tilted rolls 405c and 405c' through which is drawn the first edge portion 410a of the glass sheet 238. The edge guide roll pair 404d includes two horizontally tilted rolls 405d and 405d' through which is drawn the opposing second edge portion 410b of the glass sheet 238. The horizontally tilted rolls 405a, 405a', 405b, 405b', 405c, 405c', 405d and 405d' can be either motor driven (torque controlled) or free rolling.

Figure 4D:
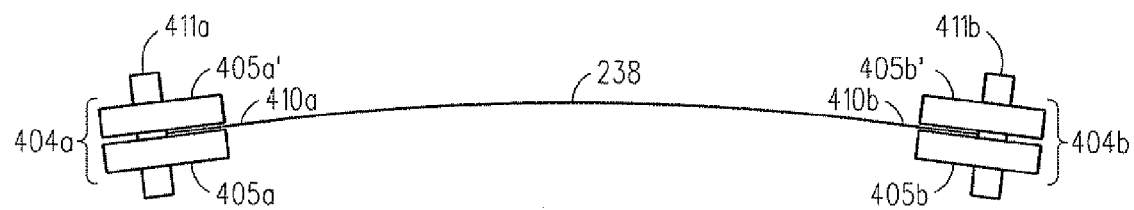

Referring to FIG. 4D, there is a cross-sectional top view of the two edge guide roll pairs 404a and 404b which indicates that these edge guide roll pairs 404a and 404b (plus the lower edge guide roll pairs 404c and 404d) are horizontally tilted to have orientations that are similar to edge portions 410a and 410b of the glass sheet 238 which helps to maintain and reinforce the bowed profile of the glass sheet 238. At this point, the glass sheet 238 has a bowed profile which in this particular example happens to be a positive bell shape. As can be seen, the horizontally tilted edge guide roll pairs 404a, 404b, 404c and 404d reinforce the bowed profile of the glass sheet 238 which helps stabilize and maintain positional control of the glass sheet 238 which in turn helps to reduce the stress within the glass sheet 238.

Figure 4E:
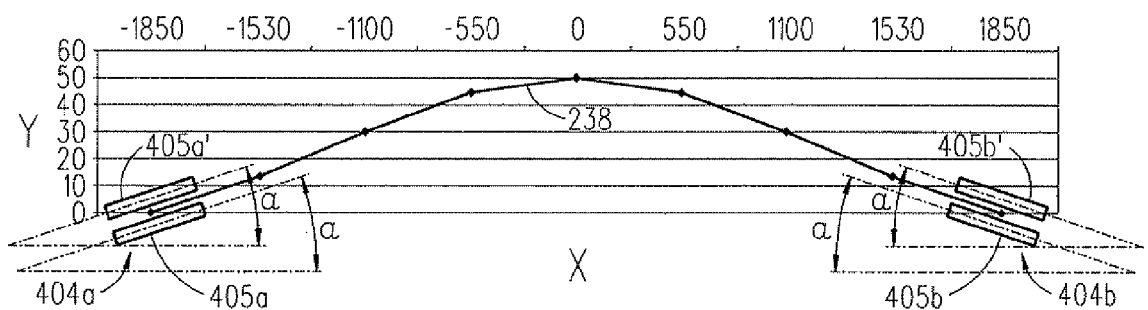

Referring to FIG. 4E, there is a plot illustrating the range of the angular adjustment of the horizontally tilted rolls 405a, 405a', 405b, 405b', 405c, 405c', 405d and 405d' in accordance with an embodiment of the present invention (note: only the horizontally tilted rolls 405a, 405a', 405b and 405b' are shown). In this plot, the x-axis is the cross-wise location on the glass sheet 238 (for example, the location along one of the lines 414a or 414b in FIG. 4A) relative to the center of the glass sheet 238 (e.g. 0 mm, at centerline 504 in FIG. 5A) in millimeters (mm), and the y-axis is the degree of distortion, displacement or bow of the glass sheet 238 in the Z direction in millimeters (mm). It can be seen in this example that the glass sheet 238 has the positive bell shape. In one embodiment, the horizontally tilted rolls 405a, 405a', 405b, 405b', 405c, 405c', 405d and 405d' have an angular adjustment ($\alpha$) which is preferably within about ±5° with the equipment and if desired the rolls could have a ±10° adjustment capability. The horizontally tilted rolls 405a, 405a', 405b, 405b', 405c, 405c', 405d and 405d' engagement with glass sheet 238 along with their angular adjustment can be manual or motorized. For large size draws (e.g., Gen 7 sized glass sheets 238 and up), the motorized engagement and adjustment is more practical considering the relatively high elevation of the horizontally tilted edge guide rolls 405a, 405a', 405b, 405b', 405c, 405c', 405d and 405d' (up to 3-4 meters in space) and the high temperature environment.

If desired, the stabilizing system 201 may include a control system 407 which has a measurement device 409 (more possible) that measures the shape (bowed profile) of the glass sheet 238 and/or the angles of sheet tilt at edges 410a and 410b. The control system 407 may also include a processor 411 and a memory 413 that stores processor-executable instructions where the processor 411 interfaces with the memory 413 and executes the processor-executable instructions to enable the following: (a) receive a signal from the sheet shape-tilt angle measurement device 409; (b) analyze the signal to obtain information about the bowed profile of the glass sheet 239 or tilt angles of edge portions 410a and 410b of the glass sheet 238; and (c) adjust, based on the bowed profile or the tilt angles of the edge portions 410a and 410b of the glass sheet 238, the horizontal tilt of all or a portion of the edge guide rolls 405a, 405a', 405b, 405b', 405c, 405c', 405d and 405d' so that they are positioned to reinforce the bowed profile of the glass sheet 238. It should be appreciated that the motors, brackets, supports and other mechanical components associated with the edge guide roll pairs 402a, 402b, 404a, 404b, 404c, and 404d have not been shown so as not to obscure the description of the present invention.

The stabilizing system 201 may also include one or more non-contact air bearings 408a, 408b and 408c (three shown) which can be positioned at or near the center region of the glass sheet 238 to help establish the desired bowed profile (e.g., positive bell shape) in the glass sheet 238. The non-contact air bearing 408a, 408b and 408c would emit a jet stream of heated gas (air) to push the center region of the glass sheet 238 so as to help establish the desired bowed profile in the glass sheet 238. Alternatively, non-contact nozzles or non-contact mechanical devices could be used instead of the non-contact air bearings 408a, 408b and 408c. If needed, the angle of the tilt of the edge guide rollers 405a, 405a', 405b, 405b', 405c, 405c', 405d and 405d' in the horizontal plane (see angle α in FIG. 4E) can be increased beyond the detected angle of the glass sheet 238, so that the edge guide rolls 405a, 405a', 405b, 405b', 405c, 405c', 405d and 405d' apply a force to the glass sheet 238 to help establish the desired bowed profile in the glass sheet 238.

In addition, the stabilizing system 201 may also have four edge squeeze rolls 411a, 411b, 411c and 411d (more or less is possible) which can be respectively positioned near the four edge guide roll pairs 404a, 404b, 404c and 404d to form four 3-roll assemblies, or be located with a desired horizontal spacing between the roll pairs 404a, 404b, 404c and 404d. If this option is implemented, then the edge squeeze rolls 411a and 411c would each apply a lateral push force on a first edge 412a of the glass sheet 238. The edge squeeze rolls 411b and 411d would each apply a lateral push force on an opposing second edge 412b of the glass sheet 238 to help form and/or maintain the desired bow shape in the glass sheet 238. At the same time, the horizontal tilt of the four edge guide rolls pairs 404a, 404b, 404c and 404d if needed could be adjusted (gradually adjusted) to press on the glass sheet 238 to help form the desired bow and change the lateral stiffness in the glass sheet 238 and not just reinforce or conform to the glass sheet 238. Or, the four edge guide rolls pairs 404a, 404b, 404c and 404d could be originally set to have the desired horizontal tilt so as to press on the glass sheet 238. Of course, the squeeze rolls 411a, 411b, 411c and 411d and the increasing of the angle of the horizontal tilt of the four edge guide rolls pairs 404a, 404b, 404c and 404d can help with the stability of the glass sheet 238 due the increased stiffness or rigidity of a bowed glass sheet 238 relative to a substantially flat or planar glass sheet 238.

Figure 5A:
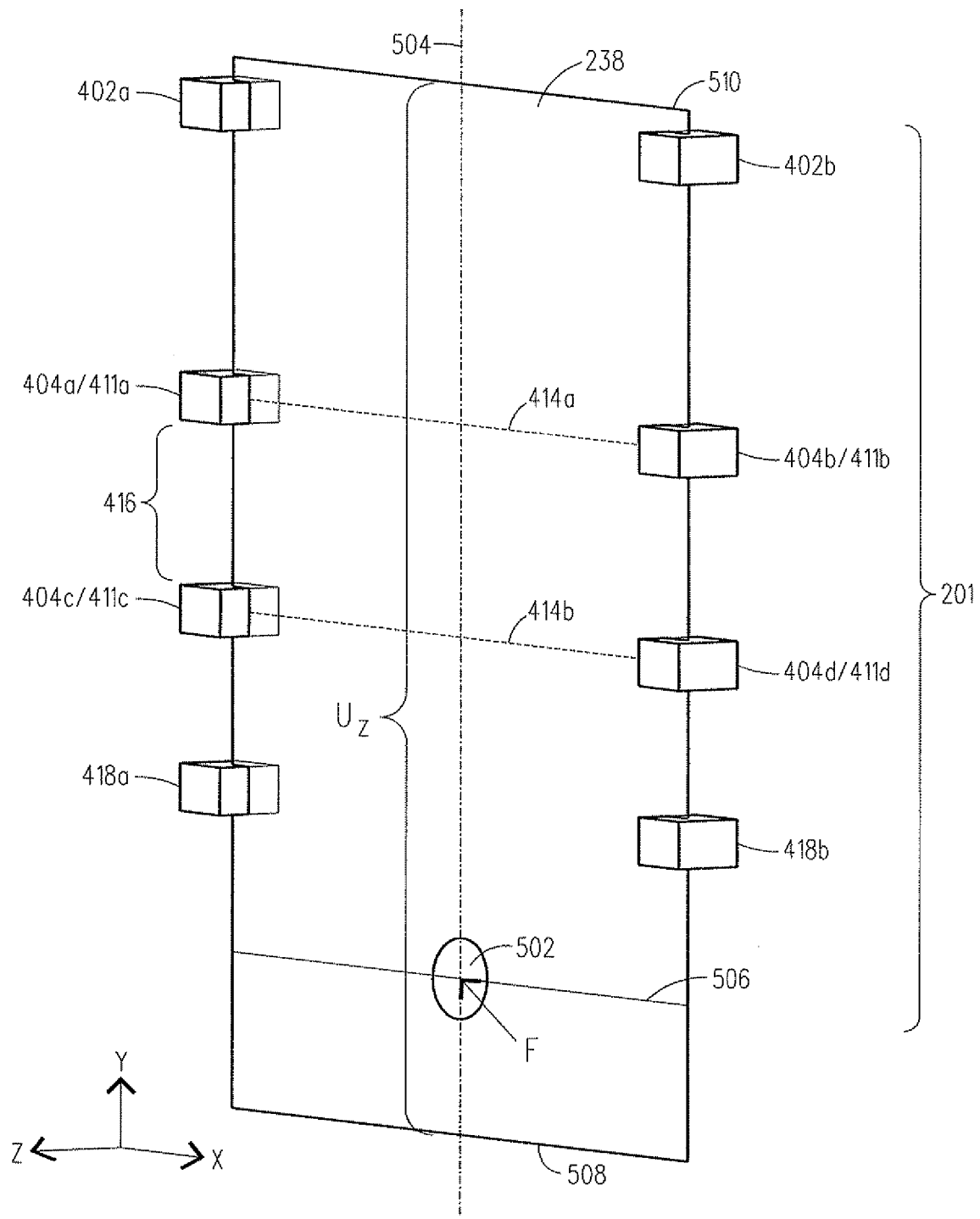
FIGS. 5A-5C include a diagram and two plots which are used to explain a modeling simulation and present the modeling results associated with using the stabilizing system which has the optional edge squeeze rolls in accordance with an embodiment of the present invention.

The four edge squeeze rolls 411a, 411b, 411c and 411d are desirable because the forces between the edge squeeze rolls 411a and 411c and their opposing edge squeeze rolls 411b and 411d, and if needed the forces caused by the horizontal tilt of the four edge guide rolls pairs 404a, 404b, 404c and 404d, effectively buckles (bends/bows) the glass sheet 238 in two regions 414a and 414b across the width of the glass sheet 238 (see FIGS. 4B and 5A). This buckled-bowed shape across the glass sheet in regions 414a and 414b can be maintained even when disturbances in the glass sheet 238, such as stresses or waves created in the glass sheet 238 by the scoring and removing of glass sheets 242 in the BOD 240, progress up the glass sheet 238 toward the FDM 210. The buckle-bow is maintained in the glass sheet 238 due to the fact that the squeeze rolls 411a, 411b, 411c and 411d, and if needed the edge guide rolls pairs 404a, 404b, 404c and 404d, prevent the glass sheet 238 from widening and flattening out. In other words, the buckle-bow shape laterally stiffens a region 416 (rigid zone 416) within the glass sheet 238. The rigid zone 416 helps to block or dampen the disturbances in the glass sheet 238 caused by the scoring action and separating action (robot contacting and bending) being performed by the TAM 212 located in the BOD 240 from traveling up to the glass sheet 238 to the FDM 210. Thus, the edge guide roll pairs 404a, 404b, 404c and 404d, along with the optional four edge squeeze rolls 411a, 411b, 411c and 411d, not only reinforce the bowed profile of the glass sheet 238, but also create the rigid zone 416 in the glass sheet 238 that serves to isolate the FDM 210 from disruptive forces created in the glass sheet 238 in the BOD 240. This helps stabilize and maintain positional control of the glass sheet 238 in the FDM 210, which in turn helps reduce the stress and variations in the shape, position and motion of the glass sheet 238 in the FDM 210, as well as in the BOD 240 and the resulting glass sheets 242. If desired, the two edge guide roll pairs 404a and 404b can have less of a horizontal tilt than the two edge guide roll pairs 404c and 404d to gradually control the buckling in the glass sheet 238. Alternatively, only two edge guide roll pairs 404a and 404b along with two squeeze rolls 411a and 411b could be used to create a small rigid zone 416 in the glass sheet 238. As can be seen, the edge squeeze rolls 411a, 411b, 411c and 411d compress the glass sheet 238 to achieve the lateral stiffness associated with the rigid zone 416 in an efficient, simple, and low cost manner. If desired, a plurality of edge guide roll and/or squeeze roll pairs, in numbers in excess of those described and illustrated herein, with a gradually increasing/decreasing degree of horizontal tilt and squeeze roll spacing/pressure may be employed to help ensure a smooth sheet bow change from the FDM 210 to BOD 240.

The stabilizing unit 201 may also include two bottom edge guide roll pairs 418a and 418b whose purpose is to ensure that the glass sheet 238 has a desired shape (e.g., flat shape, bowed shape) before undergoing the scoring and separating processes in the TAM 212. The bottom edge guide roll pair 418a includes two rolls 419a and 419a' through which is drawn the first edge portion 410a of the glass sheet 238. The bottom edge guide roll pair 418b includes two rolls 419b and 419b' through which is drawn the opposing second edge portion 410b of the glass sheet 238. The rolls 419a, 419a', 419b and 419b' can be either motor driven or free rolling.

Figure 4F:
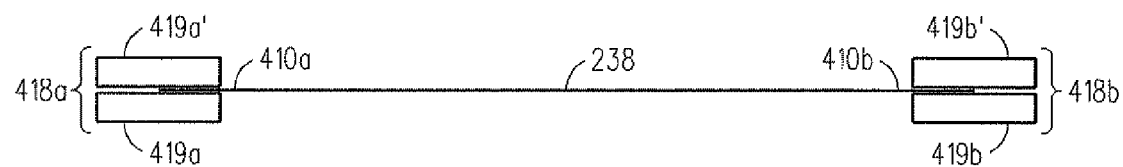

Referring to FIG. 4F, there is a cross-sectional top view of the two bottom edge guide roll pairs 418a and 418b which indicates that at this point the glass sheet 238 is not bowed but instead is relatively flat. The flattened glass sheet 238 is desirable because it enables a laser-mechanical scoring mechanism 246 to cut the glass sheet 238 with the required edge straightness and avoids having to perform another precision cutting process which is a major material and equipment cost saving opportunity. The presence of the rigid zone 416 in the glass sheet 238 prevents the motion that is caused by the flattening of the glass sheet 238 from transferring up to the bowed glass sheet 238 in the FDM 210.

Alternatively, the two bottom edge guide roll pairs 418a and 418b can ensure that the glass sheet 238 maintains a desired bowed shape and position before it undergoes the scoring and separating processes in the TAM 212 (see FIGS. 4A and 4B). This would typically occur if the optional edge squeeze rolls 411a, 411b, 411c and 411d were not used and there was no rigid zone 416 which means it would not be desirable to flatten the glass sheet 238 due to the transmission of motion up the glass sheet 238 into the FDM 210. An exemplary scoring mechanism 246 has been described in co-assigned U.S. patent application Ser. No. 12/008,949, filed Jan. 15, 2008 (the contents of which are incorporated by reference herein). An exemplary conformable nosing mechanism 248 has been described in co-assigned U.S. patent application Ser. No. 11/801,213, filed Oct. 15, 2008 (the contents of which are incorporated by reference herein).

Figure 5B:
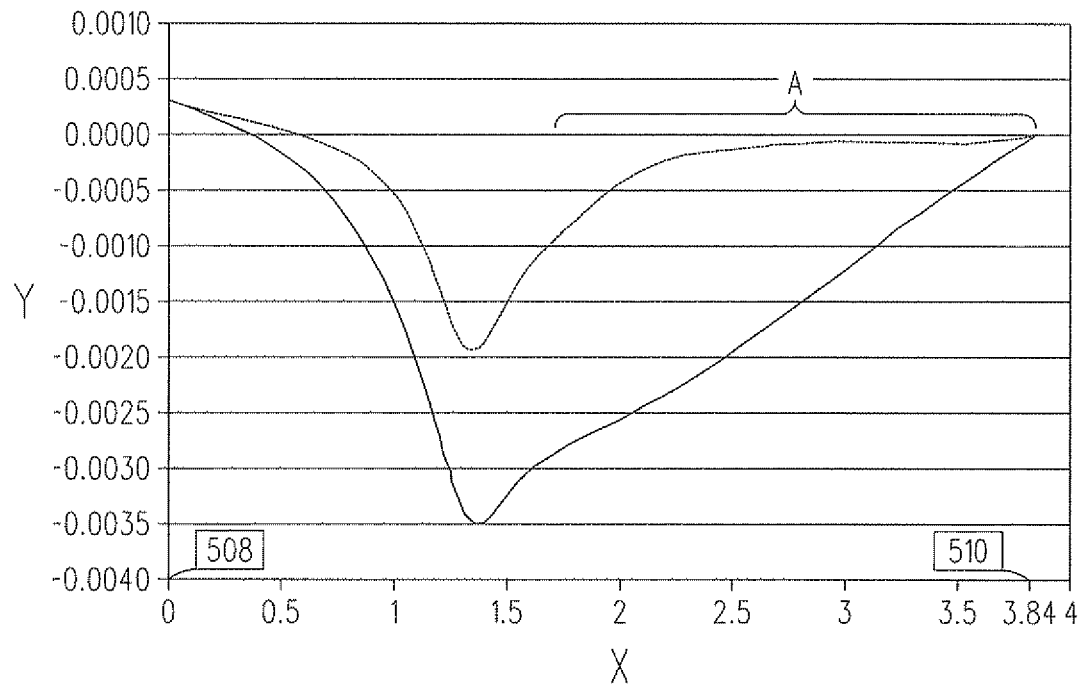
Figure 5C:
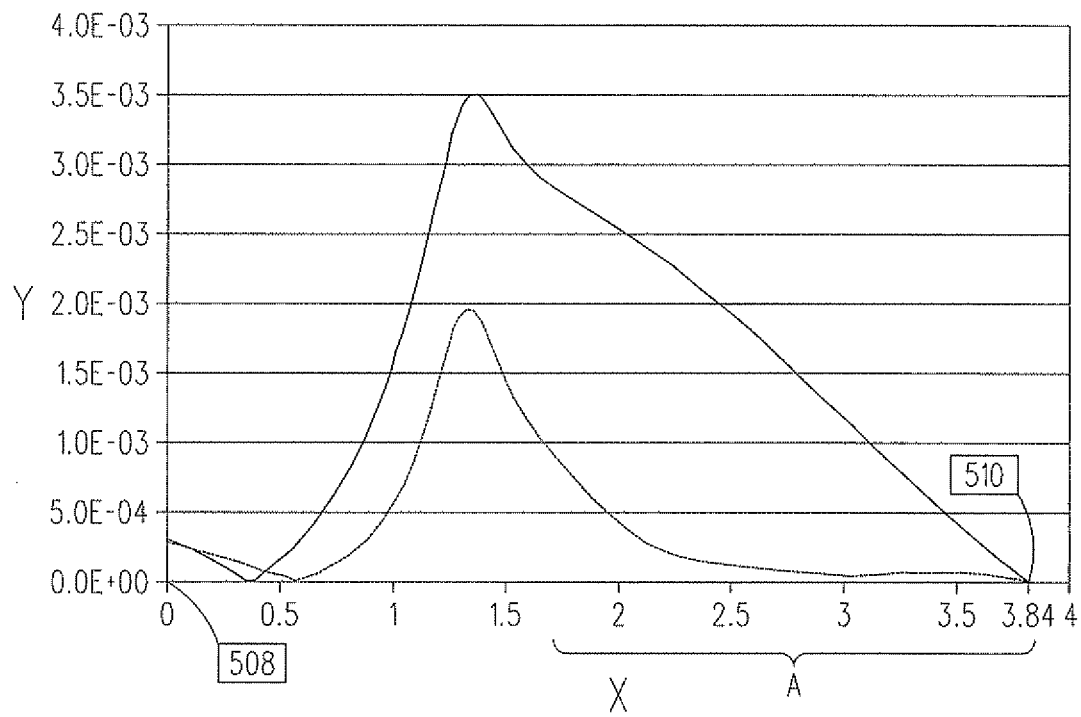

Referring to FIGS. 5A-5C, there is a diagram and two plots which are used to explain a modeling simulation and present the modeling results associated with using the stabilizing system 201 which includes the horizontally tilted edge guide roll pairs 404a, 404b, 404c and 404d and the optional edge squeeze rolls 411a, 411b, 411c and 411d which are used to create the rigid zone 416 (defined by bends 414a and 414b) in the glass sheet 238 in accordance with an embodiment of the present invention. To verify the usefulness of the optional edge squeeze rolls 411a, 411b, 411c and 411d, finite element analysis (FEA) modeling was performed using ANSYS for the glass sheet 238 under a baseline condition and under a controlled-edge squeeze condition. A front force F=1 lb was applied as a perturbation to the glass sheet 238 in a circular area 502 with a radius of 100 mm on a center line 504 of the 4 m wide glass sheet 238 at the height of a score line 506, as shown in FIG. 5A. In this simulation, only half of the glass sheet 238 was modeled by taking advantage of symmetry about the YZ plane. In FIG. 5B, there is a plot illustrating the resultant Z-displacement ($U_z$, perpendicular to the plane of the glass sheet 238) along the center line 504 from the bottom 508 to the top 510 of the glass sheet 238 as modeled for both a baseline non-squeezed glass sheet 238 (solid line) and a controlled-edge squeezed glass sheet 238 (dashed line)(note: the x-axis is the position along the centerline path 504 of the glass sheet 238 in meters (m) and the y-axis is the Z-displacement of the glass $U_z$ in meters (m)). As can be seen, the displacement of an upper portion of the controlled-edge squeezed glass sheet 238 (dashed line) is much less than the displacement of the baseline non-squeezed glass sheet 238 (solid line)(see reference "A"). FIG. 5C is a plot that compares an absolute value of $U_z$ along the center line 504 of both the baseline non-squeezed glass sheet 238 (solid line) and the controlled-edge squeezed glass sheet 238 (dashed line)(note: the x-axis is position along the centerline path 504 of the glass sheet 238 in meters (m) and the y-axis is the absolute value of the Z-displacement of the glass $|U_z|$ in meters (m)). Again, it can be seen that the displacement of an upper portion of the controlled-edge squeezed glass sheet 238 (dashed line) is much less than the displacement of the upper part of the baseline non-squeezed glass sheet 238 (solid line)(see reference "A"). Thus, the edge squeeze rolls 411a, 411b, 411c and 411d effectively increase the lateral stiffness of the glass sheet 238 from the BOD 240 to the FDM 210 and significantly reduce the displacement of the glass sheet 238 at the FDM 210.

In view of the foregoing discussion, it should be appreciated that the exemplary glass manufacturing system 200 and manufacturing method of the present invention may include following: (a) at least one vessel 202, 204, 206 and 208 for melting batch materials and forming molten glass (step 1); (b) a forming device 226 for receiving the molten glass and forming a moving glass sheet 238 (step 2); (c) an optional pull roll assembly 238 for drawing the moving glass sheet 238 (step 3); (d) a stabilizing system 201 for reinforcing a bowed profile of the glass sheet 238 (step 4)(see FIGS. 4A-4F); and (e) a TAM 212 for scoring the glass sheet 238 so the glass sheet 238 can be separated into individual glass sheets 242 (step 5). The stabilizing system 201 has several desirable features (for example): (1) maintain and reinforce the bowed profile of the glass sheet 238; (2) form a rigid zone 416 within the glass sheet 238 which blocks or dampens any disturbances (motion) to the glass sheet 238 caused by the TAM 212 from transferring up to the glass sheet 238 located in the FDM 210; and (3) optionally flatten the glass sheet 238 before entering the TAM 212 which is desirable because it enables a laser scoring mechanism 404 to cut the glass sheet 238 with the required edge straightness and avoids having to perform another precision cutting process. In addition, the stabilizing system 201 has some more advantages as follows (for example):

- Support stable and consistent shape of the glass sheet 238, and prevent reversion of bow direction in the center of the glass sheet 238 to reduce sheet stress, variations in sheet shape, and disturbances to the forming process.
- Stabilize the glass sheet 238 without the risk of contacting the glass sheet 238 inside the quality zone.
- If desired, motor driven or passive rolling rolls 402a, 402b, 404a, 404b, 404c, 404d, 411a, 411b, 411c, 411d, 418a and/or 418b with torque control can be used to minimize the impact of sheet weight variation due to sheet length change during manufacturing process and intermittent robot down force to the root 236 of the glass sheet 238 at the FDM 210 to help sheet forming process stability.
- Applicable for large size horizontal sheet transfer without contacting quality area. In particular, the present invention can be employed to buckle the glass sheet 238 to make the sheet rigid enough for transfer when a large sheet has to be moved in horizontal orientation and can not be contacted inside the sheet edge regions.
- Enable a conformable nosing or laser scoring process by creating the required shape of the glass sheet 238 at the BOD 240.
- Low cost approach and can be readily implemented on an existing draw as well as on new lines.

In the above detailed description, for purposes of explanation and not limitation, example embodiments disclosing specific details have been set forth to provide a thorough understanding of the present invention. However, it will be apparent to one with ordinary skill in the art and having had the benefit of the present disclosure, that the present invention may be practiced in other embodiments which depart from the specific details disclosed herein. Moreover, descriptions of well-known devices, methods and materials may be omitted so as not to obscure the description of the present invention. Finally, wherever applicable, like reference numerals have been used to refer to like elements herein.

Although several embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

The invention claimed is:

1. A stabilizing system for maintaining a horizontally bowed profile of a downward moving glass sheet in a downdraw glass forming process, said stabilizing system comprising:
   a first horizontally tilted edge guide roll pair and an opposing second horizontally tilted edge guide roll pair that only contact edge portions of the glass sheet without contacting a central portion of the glass sheet, wherein a first edge portion of the bowed glass sheet is drawn between the first edge guide roll pair and an opposing second edge portion of the glass sheet is drawn between the second edge guide roll pair; and
   wherein the first edge guide roll pair is horizontally tilted to have an orientation similar to the first edge portion of the bowed glass sheet and the second edge guide roll pair is horizontally tilted to have an orientation similar to the second edge portion of the bowed glass sheet so as to reinforce the bowed profile of the bowed glass sheet and thereby stabilize the position and shape of the glass sheet during the downdraw glass forming process.

2. The stabilizing system of claim 1, further comprising:
   a first edge squeeze roll positioned adjacent to the first edge guide roll pair, where the first edge squeeze roll applies a lateral push force on a first edge of the glass sheet;
   a second edge squeeze roll positioned adjacent to the second edge guide roll pair, where the second edge squeeze roll applies a lateral push force on a second edge of the glass sheet; and
   wherein the first edge squeeze roll and the second edge squeeze roll squeeze the glass sheet there between to reinforce the horizontally bowed profile of the glass sheet to create a rigid zone therein such that motion imparted on the glass sheet located below the rigid zone will not propagate upward through the rigid zone to the glass sheet located above the rigid zone.

3. The stabilizing system of claim 1, further comprising:
   a first top edge guide roll pair positioned above the first edge guide roll pair and an opposing second top edge guide roll pair positioned above the second edge guide roll pair; and
   wherein the first edge portion of the glass sheet is drawn between the first top edge guide roll pair and the second edge portion of the glass sheet is drawn between the second top edge guide roll pair.

4. The stabilizing system of claim 1, further comprising:
   a first bottom edge guide roll pair positioned below the first edge guide roll pair and an opposing second bottom edge guide roll pair positioned below the second edge guide roll pair, wherein the first edge portion of the glass sheet is drawn between the first bottom edge guide roll pair and the second edge portion of the glass sheet is drawn between the second bottom edge guide roll pair; and
   wherein the first bottom edge guide roll pair is horizontally tilted to have an orientation similar to the first edge portion of the bowed glass sheet and the second bottom edge guide roll pair is horizontally tilted to have an orientation similar to the second edge portion of the bowed glass sheet so as to reinforce the bowed profile of the bowed glass sheet and stabilize the glass sheet during the downdraw glass forming process.

5. The stabilizing system of claim 1, further comprising at least one non-contact device that is positioned near a center region of the glass sheet, wherein the at least one non-contact device is used to establish the bowed profile to the bowed glass sheet.

6. The stabilizing system of claim 1, further comprising a control system which includes:
   a measurement device that interfaces with the glass sheet;
   a processor; and
   a memory that stores processor-executable instructions where the processor interfaces with the memory and executes the processor-executable instructions to enable the following:
      receive a signal from the measurement device;
      analyze the signal to obtain information about the bowed profile of the glass sheet or tilt angles of edge portions of the glass sheet; and
      adjust, based on the bowed profile of the glass sheet or the tilt angles of the edge portions of the glass sheet, the horizontal tilt of the first edge guide roll pair and the second edge guide roll pair to reinforce the bowed profile of the glass sheet.

7. The stabilizing system of claim 1, wherein the first edge guide roll pair includes motor driven horizontally tilted rolls, and the second edge guide roll pair includes motor driven horizontally tilted rolls.

8. The stabilizing system of claim 1, wherein the first edge guide roll pair includes torque controlled horizontally tilted rolls, and the second edge guide roll pair includes torque controlled horizontally tilted rolls.

9. The stabilizing system of claim 1, wherein the first edge guide roll pair and the second edge guide roll pair are horizontally tilted at about ±5° in a horizontal plane.

10. A stabilizing system for maintaining a horizontally bowed profile of a downward moving glass sheet in a downdraw glass forming process, said stabilizing system comprising:
    a first horizontally tilted edge guide roll pair and an opposing second horizontally tilted edge guide roll pair, wherein a first edge portion of the glass sheet is drawn between the first edge guide roll pair and an opposing second edge portion of the glass sheet is drawn between the second edge guide roll pair; and
    wherein the first edge guide roll pair is horizontally tilted to have an orientation similar to the first edge portion of the glass sheet and the second edge guide roll pair is horizontally tilted to have an orientation similar to the second edge portion of the glass sheet so as to reinforce the bowed profile of the glass sheet,
    a first bottom edge guide roll pair positioned below the first edge guide roll pair and an opposing second bottom edge guide roll pair positioned below the second edge guide roll pair, wherein the first edge portion of the glass sheet is drawn between the first bottom edge guide roll pair and the second edge portion of the glass sheet is drawn between the second bottom edge guide roll pair; and
    wherein the first bottom edge guide roll pair and the second bottom edge guide roll pair are not horizontally tilted so as to substantially flatten the glass sheet.

11. A glass manufacturing system comprising:
    at least one vessel for melting batch materials and forming molten glass;
    a forming vessel for receiving the molten glass and forming a glass sheet having a bowed profile;
    a fusion draw machine for drawing the glass sheet in a downdraw glass forming process;

a stabilizing system for reinforcing a bowed profile of the bowed glass sheet, said stabilizing system comprising:

a first horizontally tilted edge guide roll pair that only contact a first edge portion of the glass sheet without contacting a central portion of the glass sheet and an opposing second horizontally tilted edge guide roll pair that only contact an opposing second edge portion of the glass sheet without contacting the central portion of the glass sheet, wherein the first edge portion of the glass sheet is drawn between the first edge guide roll pair and the opposing second edge portion of the glass sheet is drawn between the second edge guide roll pair; and wherein the first edge guide roll pair is tilted to have an orientation similar to the first edge portion of the bowed glass sheet and the second edge guide roll pair is tilted to have an orientation similar to the second edge portion of the bowed glass sheet so as to reinforce the bowed profile of the glass sheet and thereby stabilizes the position and shape of the glass sheet during the downdraw glass forming process; and a traveling anvil machine, located below the stabilizing system, for scoring the glass sheet to separate the glass sheet into individual glass sheets.

12. The glass manufacturing system of claim 11, wherein the stabilizing system further comprises:

a first edge squeeze roll positioned adjacent to the first edge guide roll pair, where the first edge squeeze roll applies a lateral push force on a first edge of the glass sheet;

a second edge squeeze roll positioned adjacent to the second edge guide roll pair, where the second edge squeeze roll applies a lateral push force on a second edge of the glass sheet; and wherein the first edge squeeze roll and the second edge squeeze roll squeeze the glass sheet there between to create a rigid zone therein such that motion imparted on the glass sheet located below the rigid zone will not propagate upward through the rigid zone to the glass sheet located above the rigid zone.

13. The glass manufacturing system of claim 11, wherein the stabilizing system further comprises:

a first top edge guide roll pair positioned above the first edge guide roll pair, and an opposing second top edge guide roll pair positioned above the second edge guide roll pair, wherein the first edge portion of the glass sheet is drawn between the first top edge guide roll pair and the second edge portion of the glass sheet is drawn between the second top edge guide roll pair.

14. The glass manufacturing system of claim 11, wherein the stabilizing system further comprises:

a first bottom edge guide roll pair positioned below the first edge guide roll pair, and an opposing second bottom edge guide roll pair positioned below the second edge guide roll pair, wherein the first edge portion of the glass sheet is drawn between the first bottom edge guide roll pair and the second edge portion of the glass sheet is drawn between the second bottom edge guide roll pair; and wherein the first bottom edge guide roll pair is horizontally tilted to have an orientation similar to the first edge portion of the bowed glass sheet and the second bottom edge guide roll pair is horizontally tilted to have an orientation similar to the second edge portion of the bowed glass sheet so as to reinforce the bowed profile of the glass sheet.

15. The glass manufacturing system of claim 11, wherein the stabilizing system further comprises at least one non-contact device that is positioned near a center region of the glass sheet to establish the bowed profile to the glass sheet.

16. The glass manufacturing system of claim 11, wherein the stabilizing system further comprises a control system which includes:

a measurement device that interfaces with the glass sheet;

a processor; and a memory that stores processor-executable instructions where the processor interfaces with the memory and executes the processor-executable instructions to enable the following:

receive a signal from the measurement device;

analyze the signal to obtain information about the bowed profile of the glass sheet or tilt angles of edge portions of the glass sheet; and adjust, based on the bowed profile of the glass sheet or the tilt angles of the edge portions of the glass sheet, the horizontal tilt in the first edge guide roll pair and the second edge guide roll pair to reinforce the bowed profile of the glass sheet.

* * * * *